(12) United States Patent  
Arunmozhi

(10) Patent No.: US 11,904,784 B2  
(45) Date of Patent: Feb. 20, 2024

(54) DETECTING OBJECTS WITHIN A VEHICLE

(71) Applicant: Motional AD LLC, Boston, MA (US)

(72) Inventor: Ashwin Arunmozhi, Monroeville, PA (US)

(73) Assignee: Motional AD LLC, Boston, MA (US)

( * ) Notice: Subject to any disclaimer, the term of this patent is extended or adjusted under 35 U.S.C. 154(b) by 202 days.

(21) Appl. No.: 17/403,365

(22) Filed: Aug. 16, 2021

(65) Prior Publication Data

US 2023/0046071 A1  Feb. 16, 2023

(51) Int. Cl.
| | |
|---|---|
| *B60R 21/00* | (2006.01) |
| *B60R 11/02* | (2006.01) |
| *B60R 11/00* | (2006.01) |
| *G08B 3/00* | (2006.01) |
| *H04R 3/00* | (2006.01) |

(52) U.S. Cl.
CPC .......... *B60R 21/00* (2013.01); *B60R 11/0247* (2013.01); *B60R 2011/0003* (2013.01); *G08B 3/00* (2013.01); *H04R 3/00* (2013.01); *H04R 2499/13* (2013.01)

(58) Field of Classification Search
CPC .......... G08G 1/16; G08G 1/166; G08G 1/167; G01B 11/00; G01B 11/02; G01B 11/026; G01B 11/26; G01S 13/931; B60Q 1/00; B60Q 9/00; B60Q 9/007; B60R 21/00; B60R 21/013; B60R 21/0136; H04Q 5/22
See application file for complete search history.

(56) References Cited

U.S. PATENT DOCUMENTS

| | | | |
|---|---|---|---|
| 10,882,538 B1 * | 1/2021 | Witt | G08G 1/166 |
| 2001/0038698 A1 | 11/2001 | Breed et al. | |
| 2007/0126564 A1 * | 6/2007 | Lee | B60Q 9/005 340/435 |
| 2008/0260175 A1 | 10/2008 | Elko | |
| 2016/0332535 A1 | 11/2016 | Bradley et al. | |
| 2017/0158202 A1 * | 6/2017 | Yang | A61B 5/002 |
| 2019/0154439 A1 * | 5/2019 | Binder | G01B 11/26 |

FOREIGN PATENT DOCUMENTS

DE  102017112738  12/2017

OTHER PUBLICATIONS

NPL Search.*

(Continued)

*Primary Examiner* — Van T Trieu  
(74) *Attorney, Agent, or Firm* — Fish & Richardson P.C.

(57) ABSTRACT

Provided are methods for detecting objects within a vehicle. The methods can include emitting at least one auditory signal within the vehicle during at least one first time interval; measuring a second auditory signal emitted by an object within the vehicle during the second time interval subsequent to the at least one first time interval, where the emission of the second auditory signal is caused by the emission of the least one first auditory signal; determining a location of the object within the vehicle based on the measurement of the second auditory signal; and generating an alert to a user indicating the location of that object. Systems and computer program products are also provided.

18 Claims, 12 Drawing Sheets

(56) References Cited

OTHER PUBLICATIONS

Hughes et al., "Microphone Location by Time of Flight Triangulation," Music Engineering Lab, University of Pittsburgh, 2014, 2 pages.

Luo et al., "Knock-knock: acoustic object recognition by using stacked denoising autoencoders," Neurocomputing, Dec. 6, 2017, 267, 6 pages.

Taseska et al., "Informed spatial filtering for sound extraction using distributed microphone arrays," IEEE/ACM Transactions on Audio, Speech, and Language Processing, Jul. 2014, 22(7): 1195-1207.

* cited by examiner

DETECTING OBJECTS WITHIN A VEHICLE

BACKGROUND

Vehicles can be used to transport people from one location to another. For example, a person can enter the passenger compartment of a vehicle, and use the vehicle to travel to a destination (e.g., by manually driving the vehicle and/or instructing an autonomous system of the vehicle to navigate the vehicle to the destination).

In some implementations, a person may misplace or otherwise leave an object in a vehicle. For example, a person may enter the vehicle with an object (e.g., a personal item, such as a bag, a phone, etc.), but exit the vehicle without taking the object with her.

DETAILED DESCRIPTION

Figure 1:
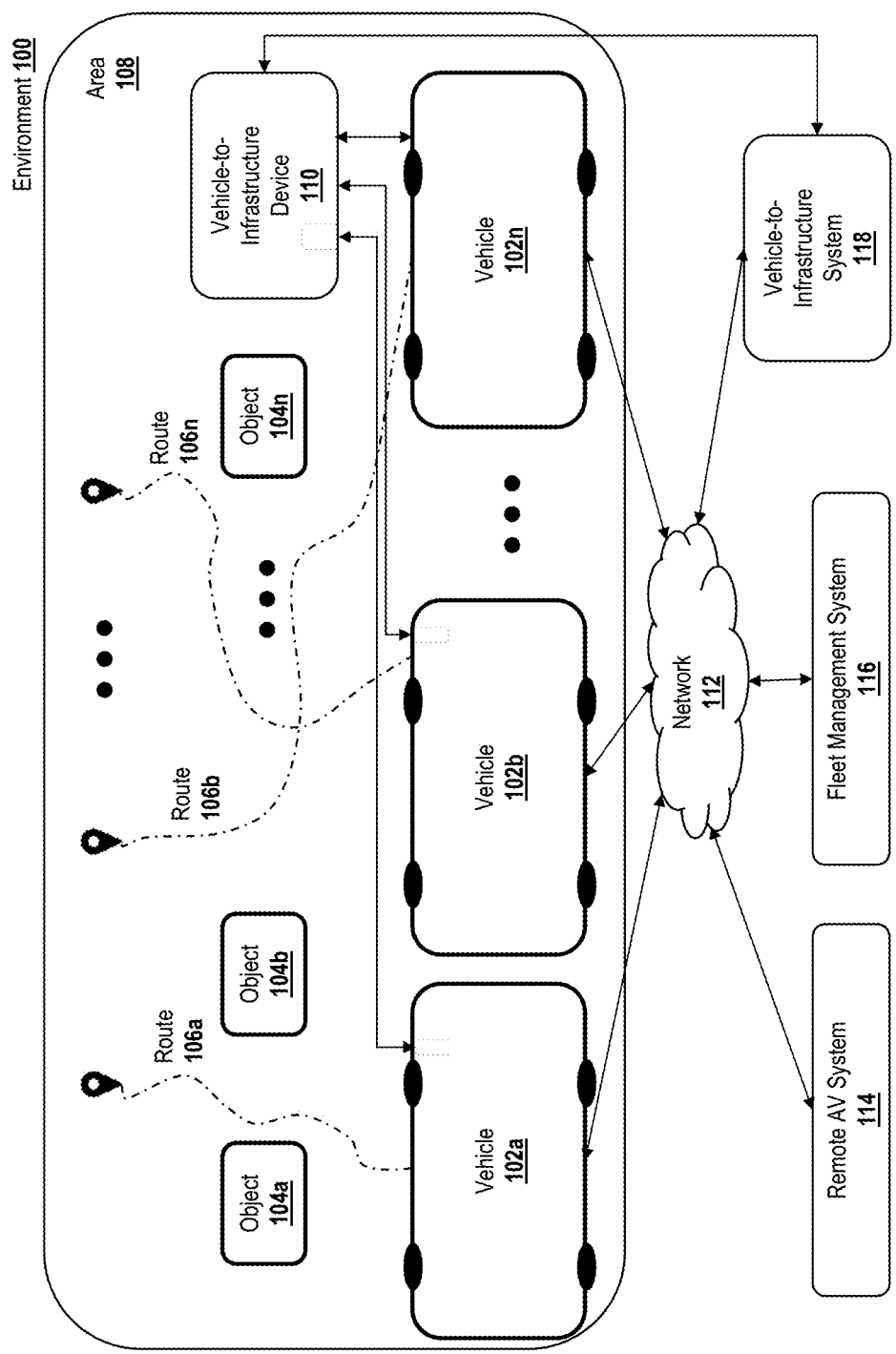
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, the systems, methods, and computer program products described herein include and/or implement techniques for detecting objects within a vehicle using sound. In an example implementation, an object detection emits sounds within a vehicle over a period of time, which causes objects within the vehicle to resonate at a particular frequency or frequencies. The system detects the resonance of those objects, and determines the location and/or identity of those objects based on the resonance (e.g., using a machine learning system). Further, the object detection system notifies a user to retrieve the object (e.g., by causing an auditory alert or an electronic message to be presented on a user's mobile device).

Some of the advantages of these techniques include enabling a vehicle to detect objects within the vehicle, such that the passenger can retrieve the objects before the objects are lost. In some implementations, this system can detect objects in locations that might otherwise be difficult to detect using other sensor techniques (e.g., under a seat or within a seat pocket, which might be hidden from view by a camera).

Further, these techniques enable a vehicle to detect objects using components that might otherwise already be included in the vehicle. For example, a vehicle will often include speakers (e.g., to play audio to a passenger) and microphones (e.g., to detect spoken commands from a user and/or enable voice communications with a user with others). These components can additionally be used to detect objects within the vehicle. This can be beneficial, for example, in reducing or eliminating the need for specialized sensors that are used solely to detect objects. Accordingly, the cost and/or complexity of manufacturing the vehicle is reduced.

Further, these techniques can reduce the likelihood that a passenger will inadvertently leave an object in a vehicle after riding in the vehicle. These techniques may be particularly advantageous in vehicles that are shared among several different users (e.g., an autonomous vehicle used in a ride-sharing service), as they can reduce delays associated with users retrieving lost items and/or the vehicle returning lost items to a passenger or service depot. Accordingly, the vehicles can be operated in a more efficient manner.

In some embodiments, the techniques described herein can be implemented within vehicles, such as vehicles having autonomous systems (e.g., autonomous vehicles) and/or vehicles that do not have autonomous systems.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
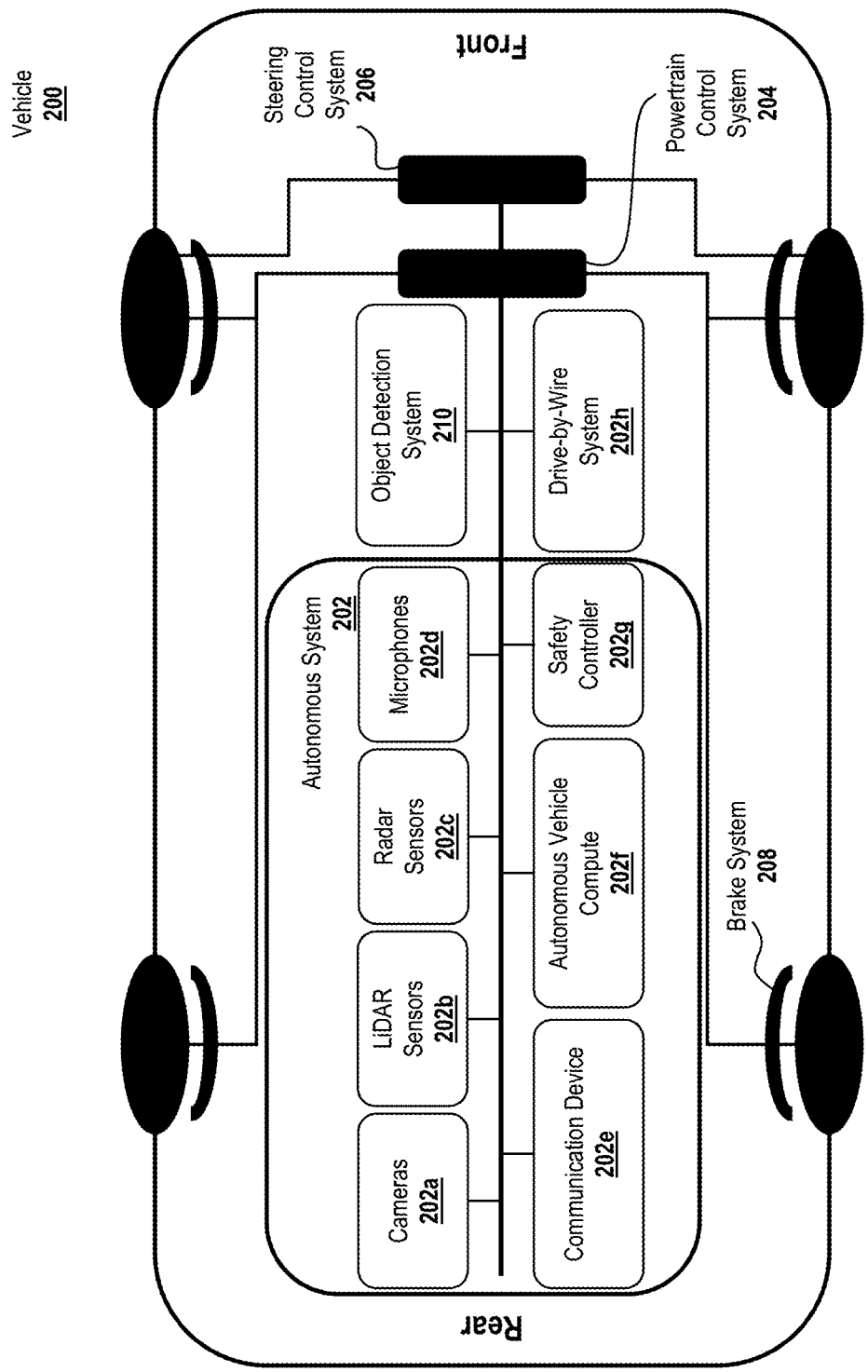
FIG. 2 is a diagram of one or more systems of a vehicle including an autonomous system.

Referring now to FIG. 2, vehicle 200 includes autonomous system 202, powertrain control system 204, steering control system 206, brake system 208, and an object detection system 210. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety.

In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
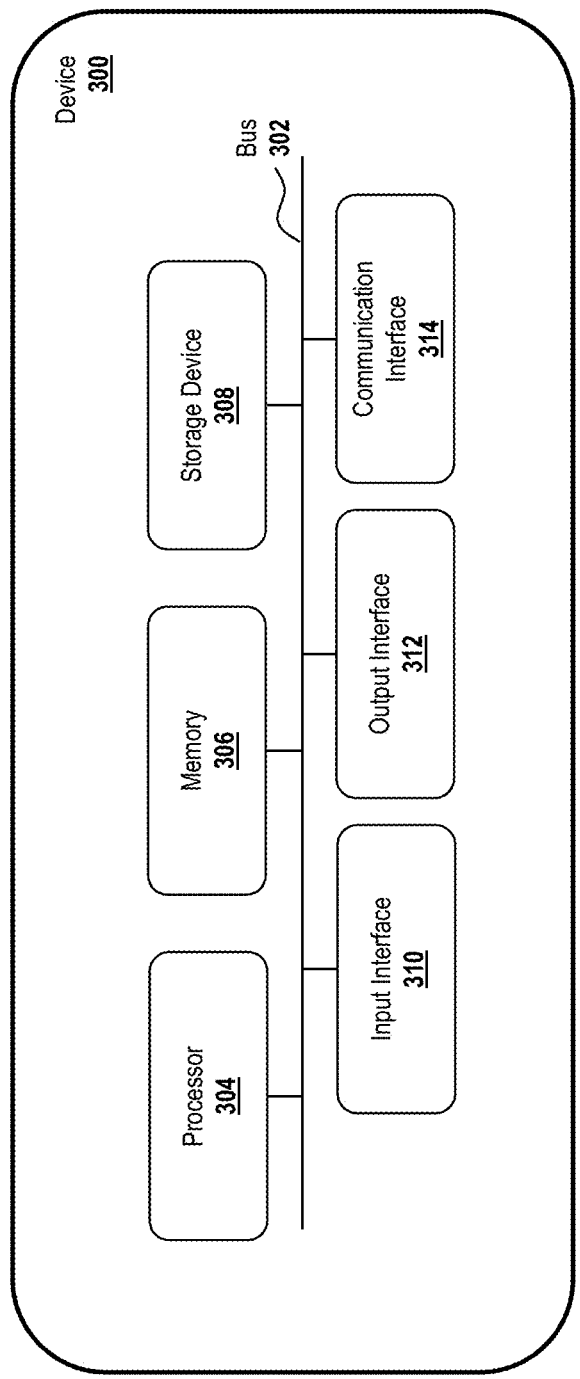
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* include at least one device configured to be in communication with cameras 202*a*, LiDAR sensors 202*b*, radar sensors 202*c*, microphones 202*d*, autonomous vehicle compute 202*f*, safety controller 202*g*, DBW system 202*h*, and/or the object detection system 210. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like) a server (e.g., a computing device including one or more central processing units, graphical processing units, and/or the like), and/or the like. In some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Further, the object detection system 210 includes at least one device configured to detect objects within the vehicle 200, and to generate notifications to at least one user regarding the detected objects. As an example, the object detection system 210 can detect objects that were brought into the vehicle 200 by a passenger (e.g., in the passenger compartment of the vehicle 200 and/or a storage compartment of the vehicle 200, such as a trunk), and left within the vehicle 200 after the passenger exited the vehicle 200. In some embodiments, the object detection system 210 can detect objects by inducing a resonance in an object within the vehicle 200 (e.g., using sound), detecting the resonance using one or more microphones, and identifying and locating the object based on the detected resonance. Further, in some embodiments, the object detection system 210 can detect objects based on sensor data obtained from the cameras 202*a*, LiDAR systems 202*b*, radar sensors 202*c*, microphones 202*d*, and/or any other sensor of the vehicle 200. Further, the object detection system 210 can generate a notification for the passenger, for example, to notify the passenger that she left an object within the vehicle 200.

In some embodiments, the object detection system 210 can be implemented, at least in part, as one or more components of the autonomous system 202. In some embodiments, the object detection system 210 can be implemented, at least in part, as one or more components or devices that are separate and distinct from the autonomous system 202.

Further details regarding the object detection system 210 are described, for example, with reference to FIGS. 4-8.

Referring now to FIG. 3, illustrated is a schematic diagram of a device 300. In some embodiments, device 300 corresponds to at least one device of vehicles 102 (e.g., at least one device of a system of vehicles 102) and/or vehicle 200, at least one device of remote AV system 114, fleet management system 116, V2I system 118, and/or one or more devices of network 112 (e.g., one or more devices of a system of network 112). In some embodiments, one or more devices of vehicles 102 and/or 202 (e.g., one or more devices of a system of vehicles 102 and 202, such as the autonomous system 202, the object detection 210, etc.), remote AV system 114, fleet management system 116, V2I system 118, and/or one or more devices of network 112 (e.g., one or more devices of a system of network 112) include at least one device 300 and/or at least one component of device 300.

As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Example Object Detection Systems

Figure 4:
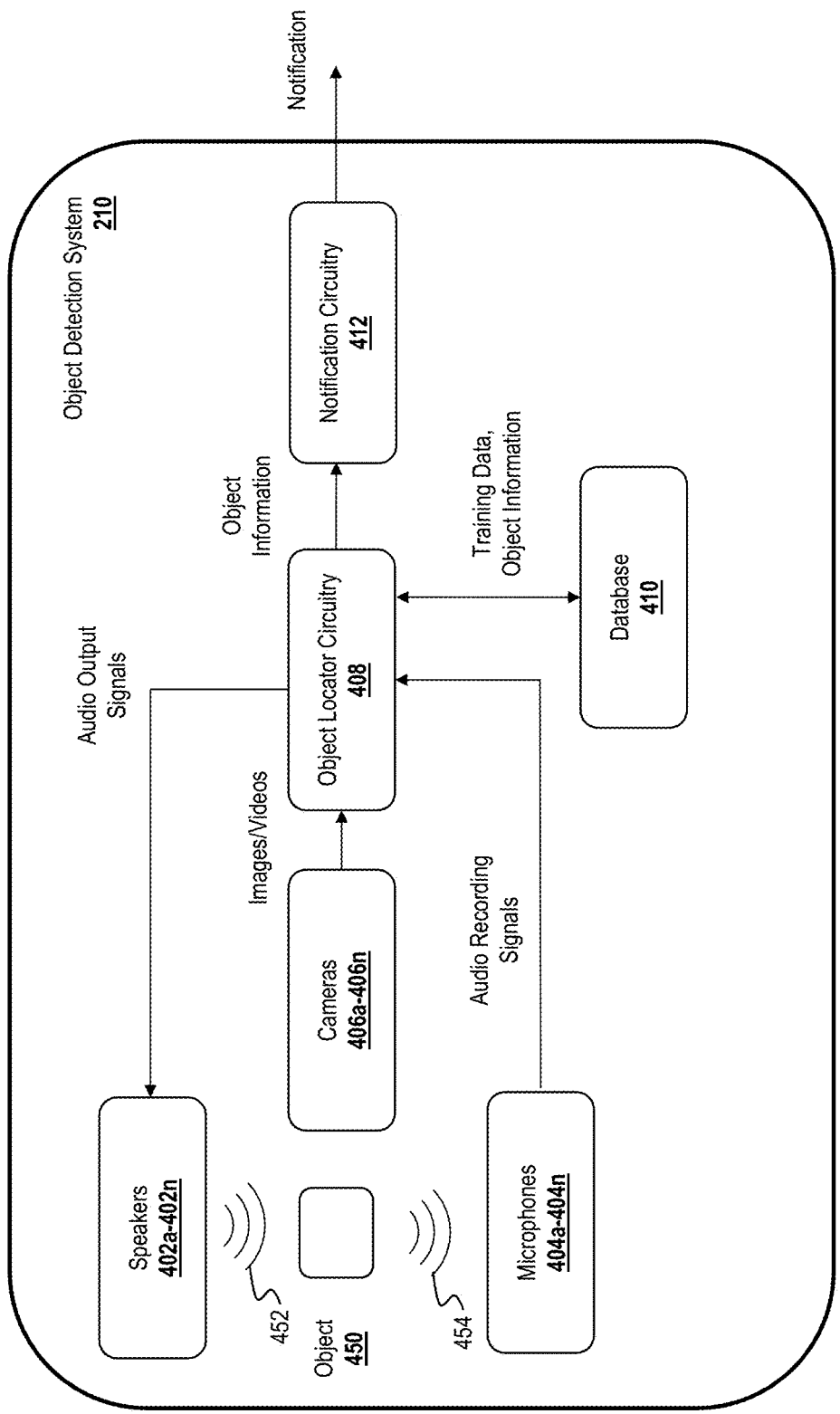
FIG. 4 is a diagram of certain components of an object detection system.

FIG. 4 shows aspects of the object detection system 210 in greater detail. The object detection system 210 includes one or more speakers 402a-402n, one or more microphones 404a-404n, and one or more cameras 406a-406n. Further, the system object detection system 210 includes object location circuitry 408, a database 410, and notification circuitry 412.

In general, the object detection system 210 is configured to detect objects (e.g., an object 450) in an interior of the vehicle 200 based on sounds, images, and/or videos representing the interior of the vehicle 200. Further, the object detection system 210 is configured to generate notifications to at least one user regarding the detected objects. As an example, the object detection system 210 can detect objects that were brought into the vehicle 200 by a passenger (e.g., in the passenger compartment of the vehicle 200 and/or a storage compartment of the vehicle 200, such as a trunk), and left within the vehicle 200 after the passenger exited the vehicle 200 Further, the object detection system 210 can generate a notification that informs the passenger that she left an object within the vehicle 200 (e.g., such that the passenger can retrieve the object).

Figure 5A:
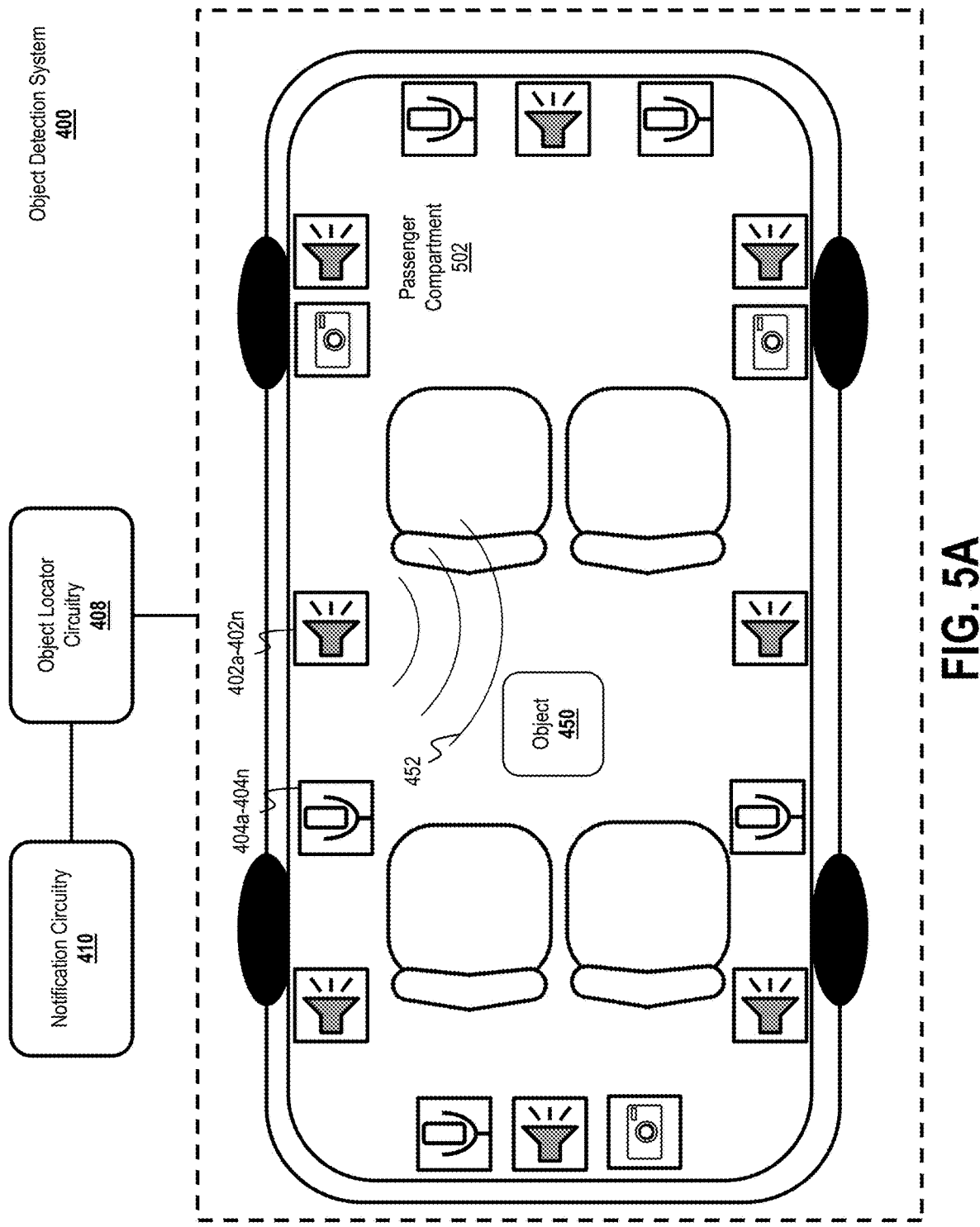
FIGS. 5A and 5B are diagrams of an example operation of an object detection system.

In some embodiments, the object detection system 210 can detect objects based, at least in part, on sound. For example, the object location circuitry 408 can generate audio output signals to one or more of the speakers 402a-402n (e.g., digital and/or analog audio signals), and instruct the speakers 402a-402n to emit sounds in the interior of the vehicle 200 in accordance with the generated audio output signals. As shown in FIGS. 4 and 5A, the emitted sounds (e.g., sound waves 452) propagate through the interior of the vehicle 200, and impinge on one or more objects within the interior of the vehicle 200 (e.g., an object 450).

In some embodiments, at least some of the speakers 402a-402n can be positioned in or otherwise directed towards the interior of the vehicle 200. As an example, as shown in FIG. 5A, at least some of the speakers 402a-402n can be positioned in or otherwise directed towards a passenger compartment 502 of the vehicle (e.g., a cabin or seating area of the vehicle 200). For instance, at least some of the speakers 402a-402n can be positioned on a dashboard, a console, a support pillar, a door, a ceiling, a floor, and/or any other location on or near the interior of the vehicle 200. As another example, at least some of the speakers 402a-402n can be positioned in or otherwise directed towards a storage compartment of the vehicle, such as a rear trunk, a front trunk, a glove box, etc.

In some embodiments, at least some of the speakers 402a-402n can be implemented as a part of an entertainment system of the vehicle 200. For example, in addition to the operations described herein, at least some of the speakers 402a-402n also can be configured to play back audio content, such as audio from a radio, audio playback device (e.g., cassette player, CD player, etc.), video playback device (e.g., a DVD player, Blu-ray player), personal electronic device (e.g., a smart phone, a wearable device, etc.) or any other device configured to output audio content.

Figure 5B:
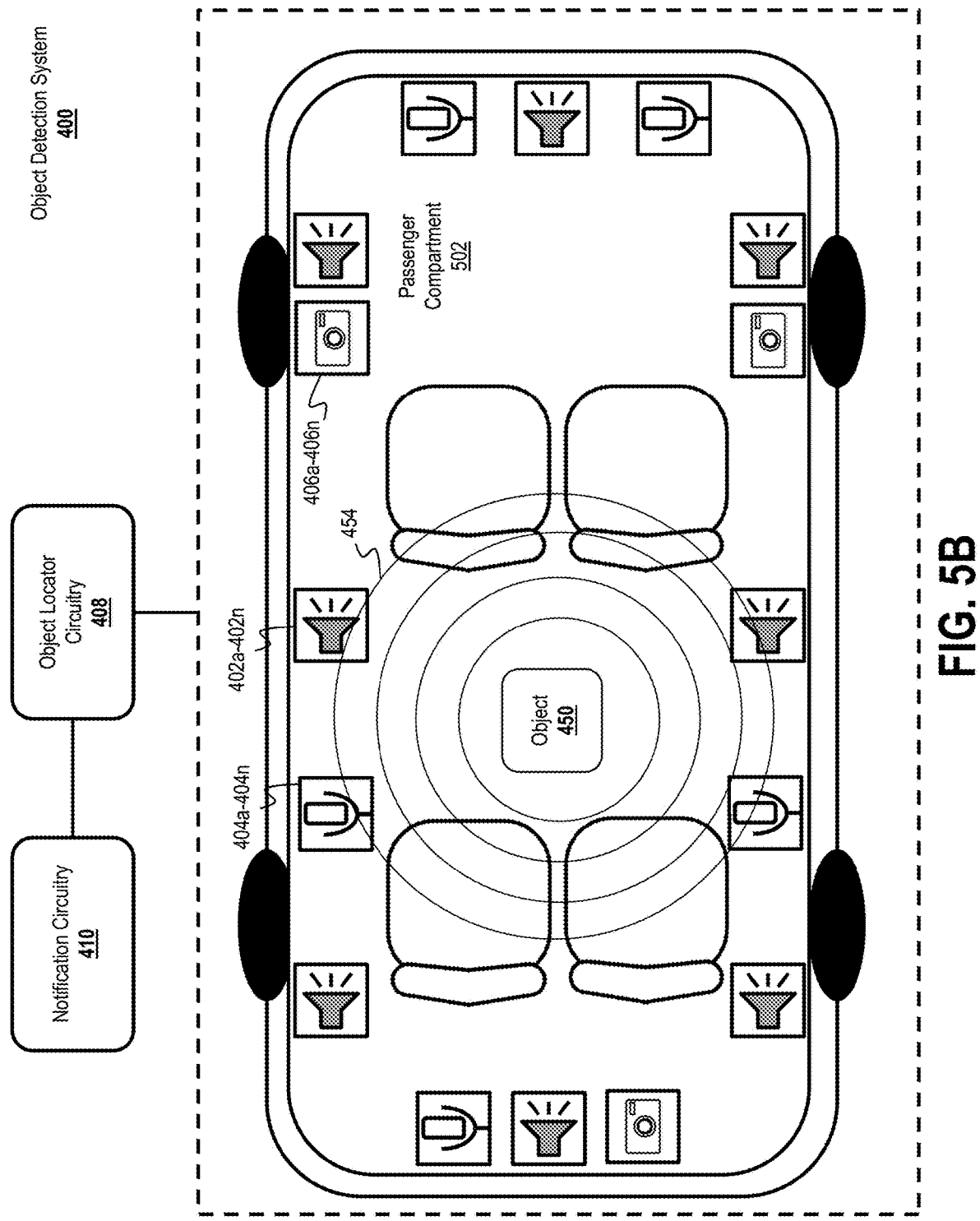

In at least some embodiments, the sound that is emitted by the speakers 402a-402n can cause the object 450 to resonate at a particular frequency or range of frequencies. For instance, due to the physical characteristics of the object 450, the object 450 may have one or more natural frequencies of vibration. Further, impingement of the sound waves 452 on the object 450 may cause the object 450 to vibrate at those natural frequencies (or harmonics thereof). This vibration may be further amplified, for example, by repeated or continuous impingement of the sound on the object 450 over a period of time (e.g., such that the object 450 resonates at a particular frequency or range of frequencies). In some embodiments, this resonance can continue, even after the speakers 402a-402n are no longer emitting sound (e.g., due to momentum). This resonance can cause further sound waves 454 to propagate from the object 450 (e.g., as shown in FIGS. 4 and 5B).

The resonance of the object 450 (e.g., in the form of the sound waves 454) is detected by one or more of the microphones 404a-404n. For example, the microphones 404a-404n can generate audio recording signals representing sounds propagating within the interior of the vehicle 200, and provide at least some of the audio recording signals to the object location circuitry 408. In some embodiments, the microphones 404a-404n can generate audio recording signals prior to, during, and/or after the emission of the sound by the speakers 402a-402n.

In some embodiments, at least some of the microphones 404a-404n also can be positioned in or otherwise directed towards the interior of the vehicle 200. As an example, as shown in FIG. 5B, at least some of the microphones 404a-404n can be positioned in or otherwise directed towards a passenger compartment 502 of the vehicle. For instance, at least some of the microphones 404a-404n can be positioned on a dashboard, a console, a support pillar, a door, a ceiling, a floor, and/or any other location on or near the interior of the vehicle 200. As another example, at least some of the microphones 404a-404n can be positioned in or otherwise directed towards a storage compartment of the vehicle, such as a rear trunk, a front trunk, a glove box, etc.

In some embodiments, at least some of the microphones 404a-404n can be implemented as a part of a communications system of the vehicle 200. For example, in addition to the operations described herein, at least some of the microphones 404a-404n also can be configured to record a passenger's voice and provide at least a portion of the recording to a wireless communications device, such as a smart phone, tablet, etc. (e.g., to facilitate the passenger's participation in a telephone call, a video call, etc.). As another example, in addition to the operations described herein, at least some of the microphones 404a-404n also can be configured to record a passenger's voice and provide at least a portion of the recording to a voice-enabled control system of the vehicle 200 (e.g., a control system configured to control one or more components of the vehicle 200 based on the passenger's spoken commands). In some implementations, at least some of the microphones 404a-404n can include one or more of the microphones 202d described with reference to FIG. 2.

Further, the object 450 also can be detected by one or more of the cameras 406a-406n. For example, the cameras 406a-406n can generate one or more images and/or videos of the interior of the vehicle 200, and provide at least some of the images and/or videos to the object location circuitry 408.

In some embodiments, at least some of the cameras 406a-406n also can be positioned in or otherwise directed towards the interior of the vehicle 200. As an example, at least some of the microphones 404a-404n can be positioned in or otherwise directed towards a passenger compartment 502 of the vehicle. For instance, at least some of the cameras 406a-406n can be positioned on a dashboard, a console, a support pillar, a door, a ceiling, a floor, and/or any other location on or near the interior of the vehicle 200. As another example, at least some of the cameras 406a-406n can be positioned in or otherwise directed towards a storage compartment of the vehicle, such as a rear trunk, a front trunk, a glove box, etc.

In some embodiments, at least some of the cameras 406a-406n also can be implemented as a part of a communications system of the vehicle 200. For example, in addition to the operations described herein, at least some of the cameras 406a-406n also can be configured to record images and/or videos of the passenger and provide at least a portion of the images and/or videos to a wireless communications device, such as a smart phone, tablet, etc. (e.g., to facilitate the passenger's participation in a video call). As another example, in addition to the operations described herein, at least some of the cameras also can be configured to record an exterior of the vehicle 200 (e.g., to facilitate autonomous operations of the vehicle, such as autonomous navigation). In some implementations, at least some of the cameras 406a-406n can include one or more of the cameras 202a described with reference to FIG. 2.

The object locator circuitry 408 determines one or more characteristics of the object 450 based on the audio recording signals received from the microphones 404a-404n, and/or the images and/or video received from the cameras 406a-406n.

As an example, the object locator circuitry 408 can determine a location of an object 450 within the interior of the vehicle 200 based on the audio recording signals received from the microphones 404a-404n, and/or the images and/or video received from the cameras 406a-406n. For instance, the object locator circuitry 408 can output data indicating a general area in which the object is located (e.g., on a particular seat of the vehicle 200, in a particular foot well of the vehicle 200, under a particular seat of the vehicle 200, in a particular storage compartment of the vehicle 200, in a particular seat pocket of the vehicle 200, etc.). As another example, the object locator circuitry 408 can output data indicating a set of spatial coordinates representing the location of the object 450 (e.g., a set of x-, y-, and z-coordinates having the vehicle as a frame of reference).

In some implementations, the object locator circuitry 408 can determine a location of an object 450, at least in part, by obtaining multiple audio recording signals using microphones 404a-404n positioned at different locations in the vehicle 200, and triangulating the source of the resonance. For example, the object locator circuitry 408 can determine, for each of the audio recording signals, a direction of the resonance relative to the position of the microphone that generated the audio recording signal. Further, the object locator circuitry 408 can determine a location or area that coincides with each of the determined directions (e.g., an intersection point or area of intersection for each of the determined directions). The object locator circuitry 408 can identify this location or area as the position of the object 450.

As another example, the object locator circuitry 408 can determine an identity or type of an object 450. For example, the object locator circuitry 408 can output data indicating a whether the object 450 is a backpack, purse, handbag, wallet, suitcase, briefcase, luggage, article of clothing (e.g., coat, shirt, pants, hat, etc.), electronic device (e.g., computer, smart phone, tablet, headphones, earbuds, etc.), glasses, sports equipment (e.g., ball, bat, racket, golf club, helmet, etc.), tool (e.g., hammer, wrench, screwdriver, etc.), jewelry (e.g., ring, watch, earrings, necklace, etc.), and/or any other type of object.

In some implementations, the object locator circuitry 408 can determine an identity or type of an object 450 based, at least in part, on the audio recording signals. For instance, each type of object can have a particular acoustic characteristic that is different from those of other types of objects. Accordingly, different types of objects can be differentiated from one another based on their acoustic characteristics.

As an example, a first type of object may have a first natural frequency (or frequencies) of vibration, and may resonate at a first resonant frequency (or frequencies) in response to the sound emitted by the speakers 402a-402n. Further, the first type of object may dampen or deaden certain frequencies of sound (e.g., due to the physical characteristics of that type of object). Further, a second type of object may have a second natural frequency (or frequencies) of vibration, and may resonate at a second resonant frequency (or frequencies) in response to the sound emitted by the speakers 402a-402n. Further, the second type of object may dampen or deaden certain other frequencies of sound (e.g., due to the physical characteristics of that type of object). The object locator circuitry 408 can differentiate between the two types of objects based on a spectral analysis of the audio recording signals (e.g., by determining the resonant frequencies and/or the dampened frequencies, and identifying the type of object having the same or similar characteristics).

Further, in some implementations, the object locator circuitry 408 can determine an identity or type of an object 450 based, at least in part, on the images and/or videos obtained by the cameras 406a-406n. For example, the object locator circuitry 408 can use a computer vision and/or image classification system to interpret the images and/or videos, and to identify the objects depicted therein.

In some implementations, the object locator circuitry 408 can obtain audio recording signals, images, and/or videos of the interior of the vehicle 200 in a "base" or "default" state (e.g., when no foreign objects have been left within the vehicle by passengers). Further, the object locator circuitry 408 can obtain additional audio recording signals, images, and/or videos of the interior of the vehicle 200 (e.g., during use of the vehicle 200), and identify changes in the recording sounds, images, and/or videos.

This technique can be beneficial, for example, in enabling the object locator circuitry 408 to differentiate between structures that are a part of the vehicle itself (e.g., seats, seat belts, dashboards, console, support pillars, doors, ceilings, floors, etc.), from objects that were brought into and left in the vehicle by a passenger. For example, the structures that are a part of the vehicle may also exhibit particular resonances in response to the emission of sound by the speakers 402a-402n. The object locator circuitry 408 can identify these resonances (e.g., based on the data obtained when the vehicle is in the base of default state), and filter out (or otherwise ignore) these resonances when locating and/or identify objects within the vehicle.

In some embodiments the object locator circuitry 408 can make at least some of the determinations described herein based on one or more machine learning models. For example, a machine learning model can be trained to receive input data (e.g., data received from the microphones 404a-404n and/or the cameras 406a-406n), and, based on the input data, generate output data associated with one or more predictions regarding the location and/or identifies of the object 450.

As an example, a machine learning model can be trained using training data regarding one or more additional objects that are or were previously located in a vehicle 200 or another vehicle (e.g., training data stored in the database 410). These additional objects can include objects that were previously detected and/or identified by the object detection system 210. These additional objects also can include objects that were previously detected and/or identified by another system (e.g., another object detection system 210).

For each of the additional objects, the training data can include input information similar to that described with reference to FIG. 4. For example, the training data can include data obtained by one or more microphones (e.g., audio recording signals representing a resonance of that object) and/or cameras (e.g., images and/or video of the interior of the vehicle) while the object was located within a vehicle.

Further, for each of the additional objects, the training data can include data representing a location of that object within the vehicle 200 (or another vehicle) at the time that the sensor measurements were obtained. For example, the database 410 can indicate a general area in which a particular object was located at the time that the sensor measurements were obtained. As another example, the training data can indicate a set of spatial coordinates representing the location of a particular object at the time that the sensor measurements were obtained.

Further, for each of the additional objects, the training data can include data representing the acoustic characteristics of that object. For example, the training data can indicate the natural frequency or frequencies of that object, a resonant frequency or frequencies or that object, and the acoustic dampening properties of that object.

Further, for each of the additional objects, the training data can include data representing an identity or type of that object. For example, the training data can indicate whether a particular object is a backpack, purse, handbag, wallet, suitcase, briefcase, luggage, article of clothing, electronic device, glasses, sports equipment, tool, jewelry, and/or any other type of object.

Based on the training data, the machine learning model can be trained to identify correlations, relationships, and/or trends between (i) the input data, (ii) the location of the an object within a vehicle, and/or (iii) the identity of that object.

Example machine learning models are described in further detail with reference to FIGS. 6A-6C.

In some embodiments, the object detection system 210 can be configured to store information regarding the object 450 (e.g., in the database 410) for future retrieval and/or processing. As an example, the object locator circuitry 408 can transmit information regarding the object 450, such as the determined location of the object 450 and/or the type of the object 450, to the database 410 for storage. As another example, the object locator circuitry 408 can transmit at least some of the sensor information obtained regarding the object 450 (e.g., audio recording signals, images, videos, etc.) to the database 410 for storage.

Further, the object detection system 210 can be configured to generate notifications to at least one user regarding the detected objects. As an example, the object locator circuitry 408 can provide the location of the object 450 and/or the type of the object 450 to the notification circuitry 412. Further, the object locator circuitry 408 can provide one or images and/or videos of the object 450 to the notification circuitry 412. The notification circuitry 412 can generate one or more notifications to a user (e.g., informing the user that the object 450 had been left in the vehicle 200). Further, the notification circuitry 412 can include information regarding the object 450 in the notification, such as a location of the object 450, the type of the object 450, an image of the object 450, and/or a video of the object 450.

In some implementations, a notification can include an email message, a chat message, a text message (e.g., a Short Message Service message), a direct message, and/or any other type of electronic message. In some implementations, a notification can include a telephone call, a voice call, a video call, or any other type of audio and/or video communication. In some implementations, a notification can include an audio alert (e.g., a warning sound) and/or a haptic alert (e.g., a vibration or pulse) that is presented using an electronic device, such as a smart phone, a tablet computer, and/or a wearable computer. In some implementations, a notification can include a visual alert (e.g., a pop up notification or notification badge) that is presented using an electronic device. In some implementations, a notification can include an audio alert (e.g., a warning sound) that is output to an exterior environment of the vehicle 200 (e.g., by a speaker or horn of the vehicle 200).

In some implementations, the object detection system 210 can determine that the object 450 had been left in the vehicle 200 by a particular user, and generate one or more notifications for that user.

As an example, the object detection system 210 can determine that the object 450 had been brought into the vehicle 200 at a particular time, and that a particular user had entered the vehicle 200 during that time (e.g., based on usage or service records of the vehicle 200, such as records regarding the booking of the vehicle 200 as a part of a ride share service). Based at least in part on this determination, the object detection system 210 can determine that the user is likely the owner of the object 450, and can generate a notification to that user regarding the object 450.

As another example, the object detection system 210 can determine that the object 450 was detected in the vehicle 200 at a particular time, and that a particular user had been riding in the vehicle 200 during that time (e.g., based on usage or service records of the vehicle 200, such as records regarding the booking of the vehicle 200 as a part of a ride share service). Based at least in part on this determination, the object detection system 210 can determine that the user is likely the owner of the object 450, and can generate a notification to that user regarding the object 450.

As another example, the object detection system 210 can determine that the object 450 had been detected at a particular location in the vehicle and at a particular time, and that the user had been seated at or around that location at that time (e.g., based on audio, images, and/or video obtained by the sensors of the vehicle 200 during that time). Based at least in part on this determination, the object detection system 210 can determine that the user is likely the owner of the object 450, and can generate a notification to that user regarding the object 450.

As another example, the object detection system 210 detect the object 450 in the vehicle 200, and that a particular user had been the most recent passenger of the vehicle time (e.g., based on usage or service records of the vehicle 200, such as records regarding the booking of the vehicle 200 as a part of a ride share service). Based at least in part on this determination, the object detection system 210 can determine that the user is likely the owner of the object 450, and can generate a notification to that user regarding the object 450.

As described above, the object detection system 210 can induce resonance in an object 450 using sound. In some implementations, the object detection system 210 can induce resonance in an object 450, at least in part, by causing certain speaker(s) 402*a*-402*n* of the vehicle 200 to emit certain sounds for certain periods of time, according to a particular number of repetitions, and/or according to a particular frequency of repetitions. As an example, the object detection system 210 can cause select a subset of the speakers 402*a*-402*n*, and provide the selected subset of speakers with a specific audio output signal. Further, the object detection system 210 can cause the selected speakers to emit sounds according to the specific audio output signal beginning at a specific start time, and ending at a specific end time. Further, the object detection system 210 can cause the selected speakers to emit sounds according to a particular number and frequency of repetitions.

In some implementations, the subset of speakers, the audio output signal, the interval of time, the number of repetitions, and/or the frequency of repetitions can be selected empirically. For example, experiments can be performed (e.g., by a developer of the object detection system 210) to identify certain combination of speakers, audio output signals, intervals of time, number of repetitions, and/or frequency of repetitions that can enhance the object detection system's accuracy and/or sensitivity in distinguishing different object locations and/or different object types.

In some implementations, the subset of speakers, the audio output signal, the interval of time, the number of repetitions, and/or the frequency of repetitions can be selected using machine learning. For example, a machine learning model can be used to identify certain combination of speakers, audio output signals, intervals of time, number of repetitions, and/or frequency of repetitions that can enhance the object detection system's accuracy and/or sensitivity in distinguishing different object locations and/or different object types.

In general, an audio output signal can include ultrasonic spectral components, spectral components that are within an audible range of humans, and/or infrasonic spectral components.

In some implementations, the audio output signal can include a sinusoidal signal having a single frequency or several frequencies (e.g., one or more ranges of frequencies). In some embodiments, the audio output signal can include a sinusoidal sinusoid sweep signal (e.g., a sinusoidal signal having a frequency that varies with time).

Figure 6A:
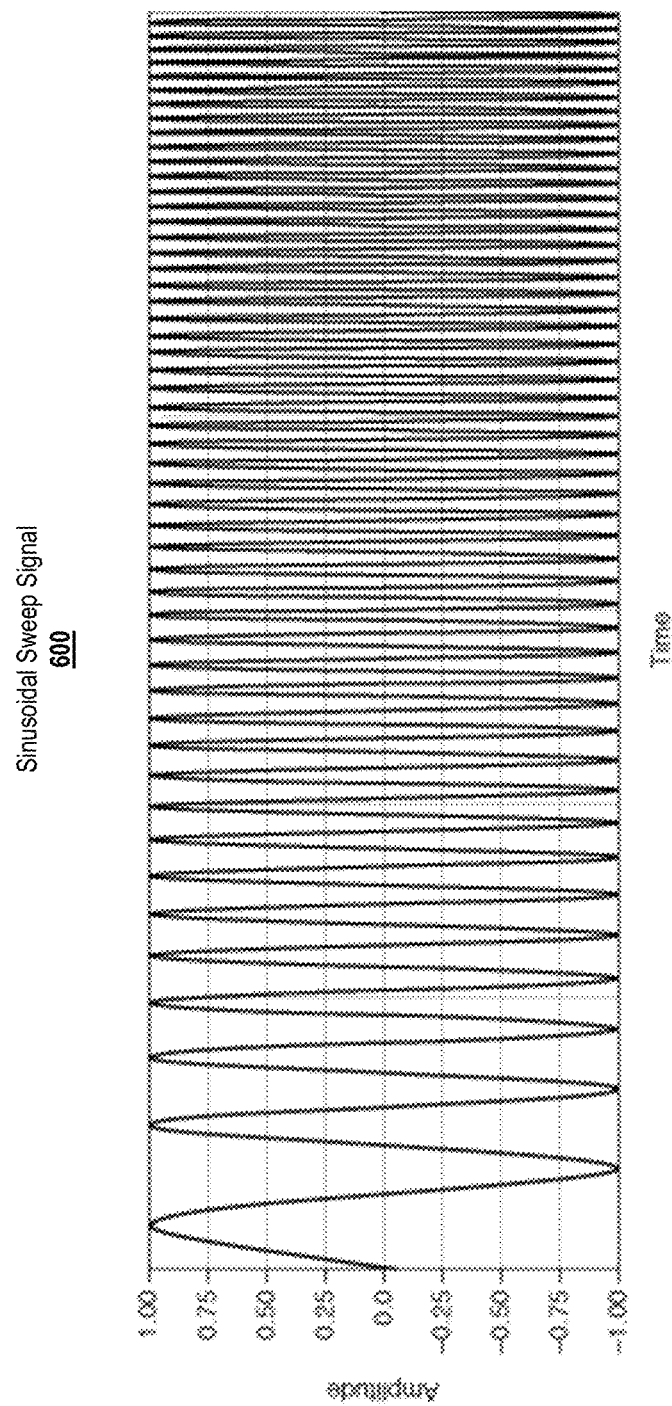
FIG. 6A is a diagram of an example sinusoidal sweep signal.
Figure 6B:
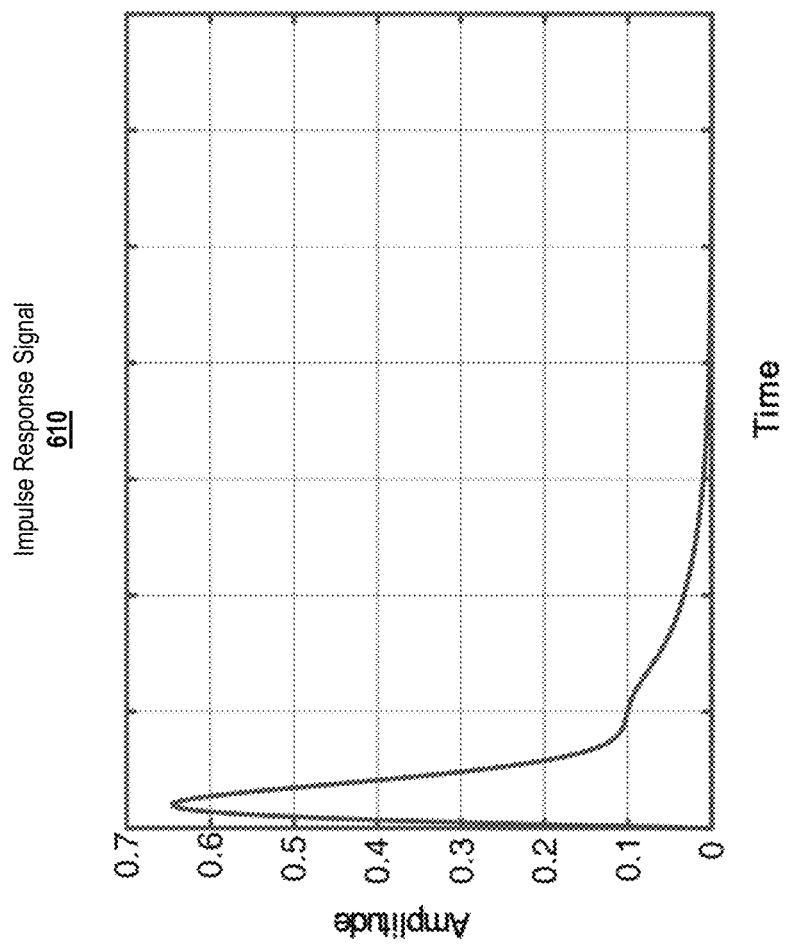
FIG. 6B is a diagram of an example impulse response signal.

An example sinusoidal sweep signal 600 is shown in FIG. 6A. In this example, the sinusoidal sweep signal 600 monotonically increases in frequency over time (e.g., from a first lower frequency to a second higher frequency). Nevertheless, different sinusoidal sweep signal also can be used, either instead of or in addition to the sinusoidal sweep signal 600 shown in FIG. 600. For example, a sinusoidal sweep signal can have monotonically decrease in frequency over time. As another example, a sinusoidal sweep signal can include intervals of time in which the frequency increases, and other intervals of time in which the frequency decreases.

In some implementations, the audio output signal can include an impulse response signal (e.g., a signal having a localized intensity peak or impulse consistent with or approximating an impulse response function (IRF)). An example impulse response signal 610 is shown in FIG. 6B.

Although the examples described herein pertain to identifying objects that have been left within a vehicle 200, in some implantations, the systems and techniques described herein also can be used to identify objects that have been left outside of a vehicle 200. For example, at least some of the speakers 402a-402n can be configured to output sound to an exterior environment of the vehicle 200. Further, at least some of the microphones 404a-404n can be configured to generate audio recording signals representing sounds in the exterior environment. Further, at least some of the cameras 406a-406n can be configured to generate images and/or videos representing the exterior environment. The object detection system 210 can locate and/or identify objects based on the audio recording signals, the images, and/or the videos (e.g., in a similar manner as described above).

Figure 7A:
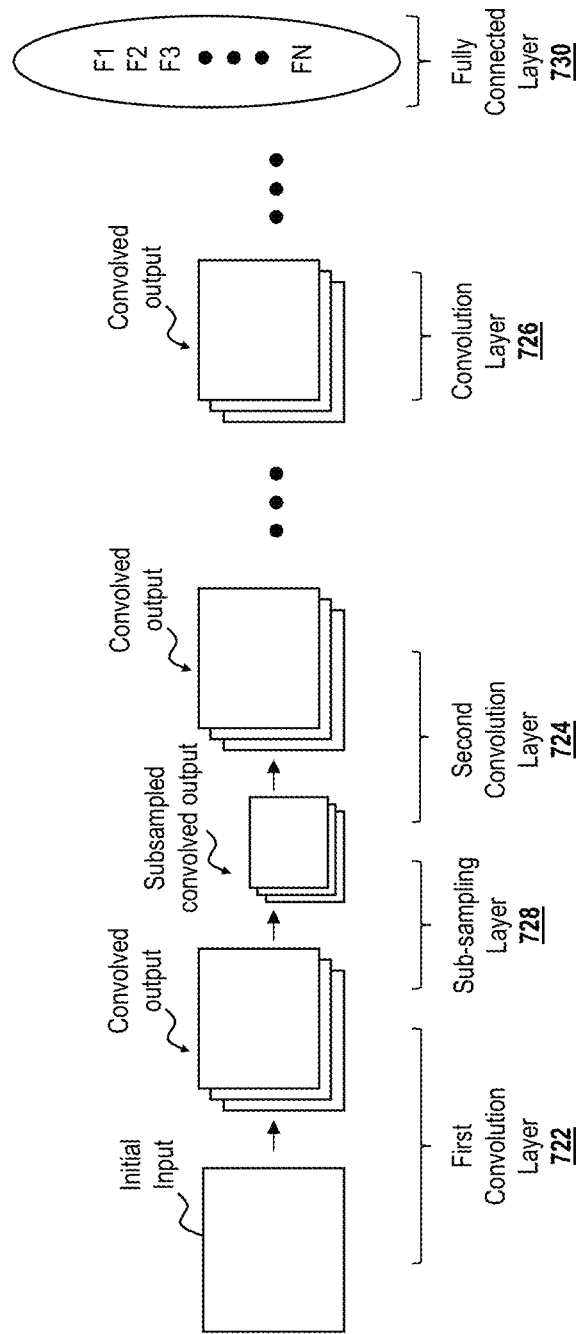
FIG. 7A is a diagram of an implementation of a neural network.

At least some of the techniques describe herein can be implemented using one or more machine learning models. As an example, FIG. 7A shows a diagram of an implementation of a machine learning model. More specifically, illustrated is a diagram of an implementation of a convolutional neural network (CNN) 720. For purposes of illustration, the following description of CNN 720 will be with respect to an implementation of CNN 620 by the object detection system 400. However, it will be understood that in some examples CNN 720 (e.g., one or more components of CNN 720) is implemented by other systems different from, or in addition to, the object detection system 500, such as the autonomous vehicle compute 202f. While CNN 720 includes certain features as described herein, these features are provided for the purpose of illustration and are not intended to limit the present disclosure.

CNN 720 includes a plurality of convolution layers including first convolution layer 722, second convolution layer 724, and convolution layer 726. In some embodiments, CNN 720 includes sub-sampling layer 728 (sometimes referred to as a pooling layer). In some embodiments, sub-sampling layer 728 and/or other subsampling layers have a dimension (i.e., an amount of nodes) that is less than a dimension of an upstream system. By virtue of sub-sampling layer 728 having a dimension that is less than a dimension of an upstream layer, CNN 720 consolidates the amount of data associated with the initial input and/or the output of an upstream layer to thereby decrease the amount of computations necessary for CNN 720 to perform downstream convolution operations. Additionally, or alternatively, by virtue of sub-sampling layer 728 being associated with (e.g., configured to perform) at least one subsampling function (as described below with respect to FIGS. 7B and 7C), CNN 720 consolidates the amount of data associated with the initial input.

The object detection system 210 performs convolution operations based on the object detection system 210 providing respective inputs and/or outputs associated with each of first convolution layer 722, second convolution layer 724, and convolution layer 726 to generate respective outputs. In some examples, the object detection system 210 implements CNN 720 based on the object detection system 210 providing data as input to first convolution layer 722, second convolution layer 724, and convolution layer 726. In such an example, object detection system 210 provides the data as input to first convolution layer 722, second convolution layer 724, and convolution layer 726 based on the object detection system 210 receiving data from one or more different systems (e.g., the microphones 404a-404n, cameras 406a-406n, the database 410, etc.). A detailed description of convolution operations is included below with respect to FIG. 7B.

In some embodiments, the object detection system 210 provides data associated with an input (referred to as an initial input) to first convolution layer 722 and the object detection system 210 generates data associated with an output using first convolution layer 722. In some embodiments, the object detection system 210 provides an output generated by a convolution layer as input to a different convolution layer. For example, the object detection system 210 provides the output of first convolution layer 722 as input to sub-sampling layer 728, second convolution layer 724, and/or convolution layer 726. In such an example, first convolution layer 722 is referred to as an upstream layer and sub-sampling layer 628, second convolution layer 724, and/or convolution layer 726 are referred to as downstream layers. Similarly, in some embodiments the object detection system 210 provides the output of sub-sampling layer 728 to second convolution layer 724 and/or convolution layer 726 and, in this example, sub-sampling layer 728 would be referred to as an upstream layer and second convolution layer 724 and/or convolution layer 726 would be referred to as downstream layers.

In some embodiments, the object detection system 210 processes the data associated with the input provided to CNN 720 before the object detection system 210 provides the input to CNN 720. For example, the object detection system 210 processes the data associated with the input provided to CNN 720 based on the object detection system 210 and normalizing sensor data (e.g., audio data, image data, video data, and/or the like).

In some embodiments, CNN 720 generates an output based on the object detection system 210 performing convolution operations associated with each convolution layer. In some examples, CNN 720 generates an output based on the object detection system 210 performing convolution operations associated with each convolution layer and an initial input. In some embodiments, the object detection system 210 generates the output and provides the output as fully connected layer 730. In some examples, the object detection system 210 provides the output of convolution layer 726 as fully connected layer 730, where fully connected layer 730 includes data associated with a plurality of feature values referred to as F1, F2 . . . FN. In this example, the output of convolution layer 726 includes data associated with a plurality of output feature values that represent a prediction.

In some embodiments, the object detection system 210 identifies a prediction from among a plurality of predictions based on the object detection system 210 identifying a feature value that is associated with the highest likelihood of being the correct prediction from among the plurality of predictions. For example, where fully connected layer 730 includes feature values F1, F2, . . . FN, and F1 is the greatest feature value, the object detection system 210 identifies the prediction associated with F1 as being the correct prediction from among the plurality of predictions. In some embodiments, the object detection system 210 trains CNN 720 to generate the prediction. In some examples, the object detection system 210 trains CNN 720 to generate the prediction based on the object detection system 210 providing training data associated with the prediction to CNN 720.

A prediction can include, for example, a predicted location of an object within the interior of the vehicle 200. As another example, a prediction can include predicted characteristics of the object (e.g., a type, category, or identity of object).

Figure 7B:
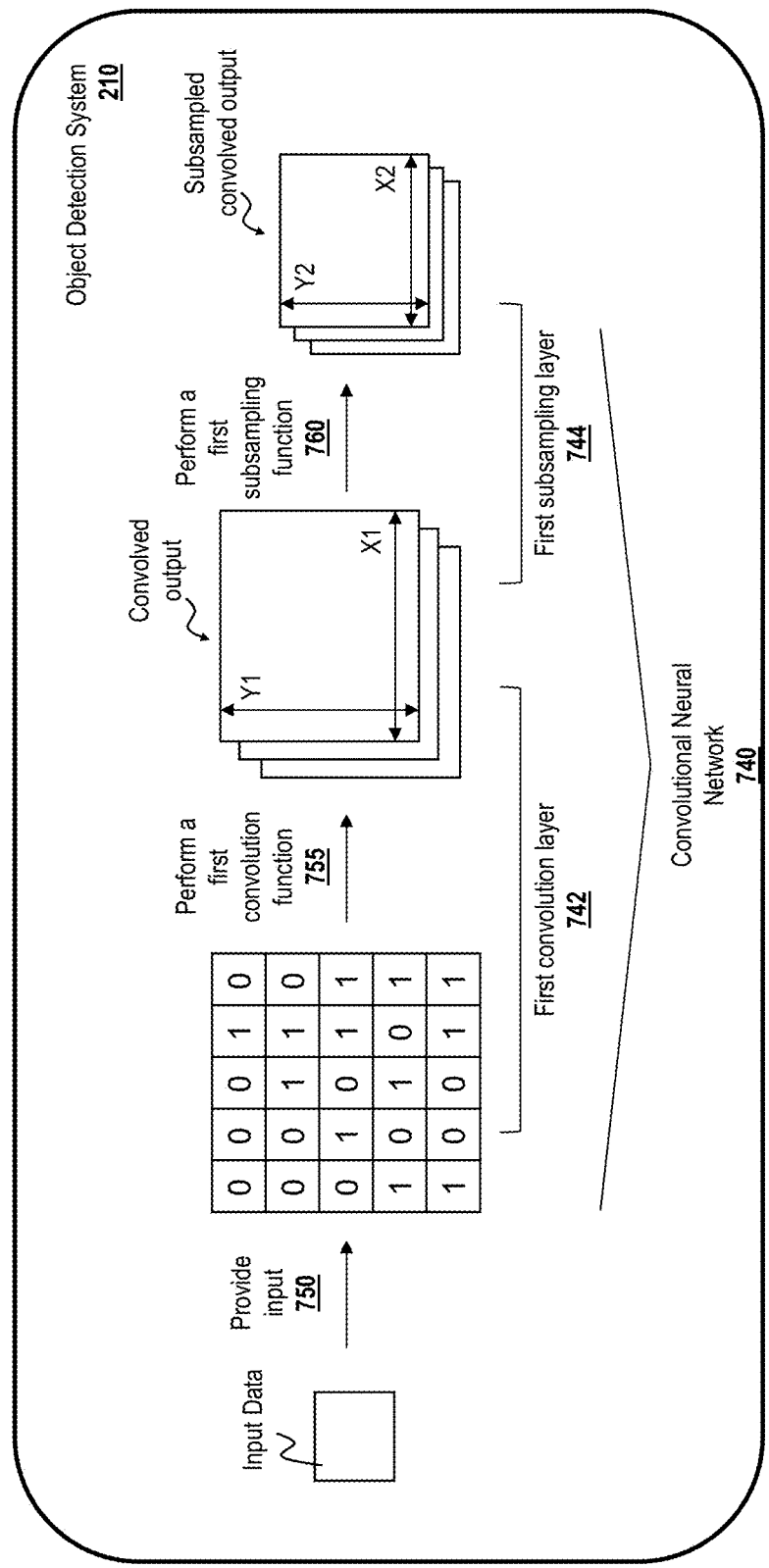
FIGS. 7B and 7C are diagram illustrating example operation of a neural network.
Figure 7C:
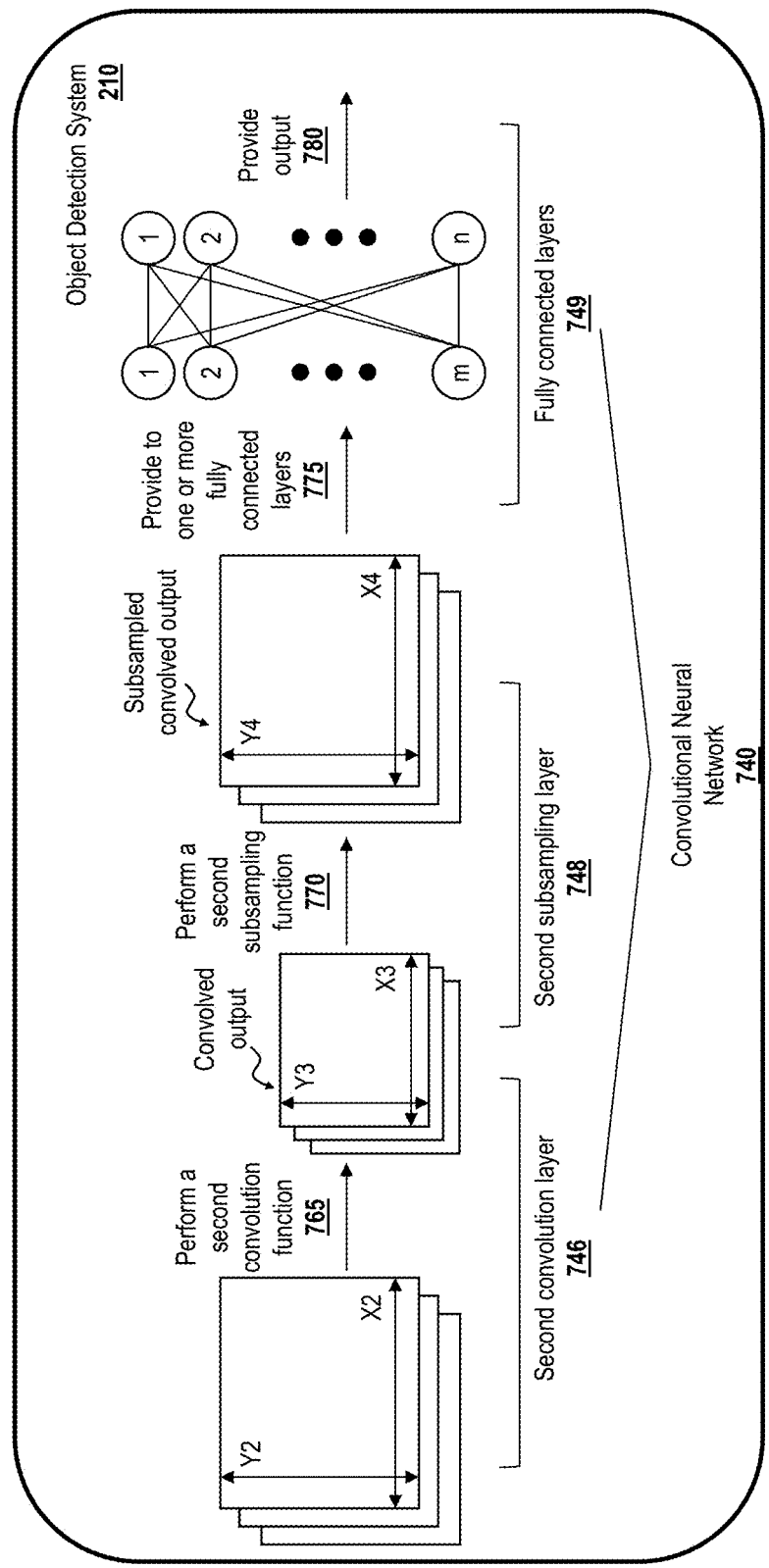

Referring now to FIGS. 7B and 7C, illustrated is a diagram of example operation of CNN 740 by the object detection system 210. In some embodiments, CNN 740 (e.g., one or more components of CNN 740) is the same as, or similar to, CNN 720 (e.g., one or more components of CNN 720) (see FIG. 7A).

At step 750, the object detection system 210 provides data as input to CNN 740 (step 750). For example, the object detection system 210 can provide data obtained by one or more of the microphones 404a-404n and/or the cameras 406a-406n. As another example, the object detection system 210 can provide data received from the database 410.

At step 755, CNN 740 performs a first convolution function. For example, CNN 740 performs the first convolution function based on CNN 740 providing the values representing the input data as input to one or more neurons (not explicitly illustrated) included in first convolution layer 742. As an example, the values representing an image or video can correspond to values representing a region of the image or video (sometimes referred to as a receptive field). As another example, the values representing an audio signal can correspond to values representing a portion or the audio signal (e.g., a particular temporal portion and/or a particular spectral portion). As another example, the values representing some other sensor measurement can correspond to values representing a portion of that sensor measurement (e.g., a particular temporal portion and/or a particular spectral portion).

In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges in an image (e.g., horizontal lines, vertical lines, straight lines, and/or the like). In successive convolution layers, the filters associated with neurons may be configured to identify successively more complex patterns in the image (e.g., arcs, objects, and/or the like). In another example, a filter may be configured to identify spectral portions of an audio signal (e.g., portions of an audio signal corresponding to particular frequencies and/or frequency ranges). In successive convolution layers, the filters associated with neurons may be configured to identify successively more complex patterns in the audio signal (e.g., patterns indicative of a location of a source of the audio, an identify or type of the source of the audio, etc.).

In some embodiments, CNN 740 performs the first convolution function based on CNN 740 multiplying the values provided as input to each of the one or more neurons included in first convolution layer 742 with the values of the filter that corresponds to each of the one or more neurons. For example, CNN 740 can multiply the values provided as input to each of the one or more neurons included in first convolution layer 742 with the values of the filter that corresponds to each of the one or more neurons to generate a single value or an array of values as an output. In some embodiments, the collective output of the neurons of first convolution layer 742 is referred to as a convolved output. In some embodiments, where each neuron has the same filter, the convolved output is referred to as a feature map.

In some embodiments, CNN 740 provides the outputs of each neuron of first convolutional layer 742 to neurons of a downstream layer. For purposes of clarity, an upstream layer can be a layer that transmits data to a different layer (referred to as a downstream layer). For example, CNN 740 can provide the outputs of each neuron of first convolutional layer 742 to corresponding neurons of a subsampling layer. In an example, CNN 740 provides the outputs of each neuron of first convolutional layer 742 to corresponding neurons of first subsampling layer 744. In some embodiments, CNN 740 adds a bias value to the aggregates of all the values provided to each neuron of the downstream layer. For example, CNN 740 adds a bias value to the aggregates of all the values provided to each neuron of first subsampling layer 744. In such an example, CNN 740 determines a final value to provide to each neuron of first subsampling layer 744 based on the aggregates of all the values provided to each neuron and an activation function associated with each neuron of first subsampling layer 744.

At step 760, CNN 740 performs a first subsampling function. For example, CNN 740 can perform a first subsampling function based on CNN 740 providing the values output by first convolution layer 742 to corresponding neurons of first subsampling layer 744. In some embodiments, CNN 740 performs the first subsampling function based on an aggregation function. In an example, CNN 740 performs the first subsampling function based on CNN 740 determining the maximum input among the values provided to a given neuron (referred to as a max pooling function). In another example, CNN 740 performs the first subsampling function based on CNN 740 determining the average input among the values provided to a given neuron (referred to as an average pooling function). In some embodiments, CNN 740 generates an output based on CNN 740 providing the values to each neuron of first subsampling layer 744, the output sometimes referred to as a subsampled convolved output.

At step 765, CNN 740 performs a second convolution function. In some embodiments, CNN 740 performs the second convolution function in a manner similar to how CNN 740 performed the first convolution function, described above. In some embodiments, CNN 740 performs the second convolution function based on CNN 740 providing the values output by first subsampling layer 744 as input to one or more neurons (not explicitly illustrated) included in second convolution layer 746. In some embodiments, each neuron of second convolution layer 746 is associated with a filter, as described above. The filter(s) associated with second convolution layer 746 may be configured to identify more complex patterns than the filter associated with first convolution layer 742, as described above.

In some embodiments, CNN 740 performs the second convolution function based on CNN 740 multiplying the values provided as input to each of the one or more neurons included in second convolution layer 746 with the values of the filter that corresponds to each of the one or more neurons. For example, CNN 740 can multiply the values provided as input to each of the one or more neurons included in second convolution layer 746 with the values of the filter that corresponds to each of the one or more neurons to generate a single value or an array of values as an output.

In some embodiments, CNN 740 provides the outputs of each neuron of second convolutional layer 746 to neurons of a downstream layer. For example, CNN 740 can provide the outputs of each neuron of first convolutional layer 742 to corresponding neurons of a subsampling layer. In an example, CNN 740 provides the outputs of each neuron of first convolutional layer 742 to corresponding neurons of second subsampling layer 748. In some embodiments, CNN 740 adds a bias value to the aggregates of all the values provided to each neuron of the downstream layer. For example, CNN 740 adds a bias value to the aggregates of all the values provided to each neuron of second subsampling layer 748. In such an example, CNN 740 determines a final value to provide to each neuron of second subsampling layer 748 based on the aggregates of all the values provided to each neuron and an activation function associated with each neuron of second subsampling layer 748.

At step 770, CNN 740 performs a second subsampling function. For example, CNN 740 can perform a second subsampling function based on CNN 740 providing the values output by second convolution layer 746 to corresponding neurons of second subsampling layer 748. In some embodiments, CNN 740 performs the second subsampling function based on CNN 740 using an aggregation function. In an example, CNN 740 performs the first subsampling function based on CNN 740 determining the maximum input or an average input among the values provided to a given neuron, as described above. In some embodiments, CNN 740 generates an output based on CNN 740 providing the values to each neuron of second subsampling layer 748.

At step 775, CNN 740 provides the output of each neuron of second subsampling layer 748 to fully connected layers 749. For example, CNN 740 provides the output of each neuron of second subsampling layer 748 to fully connected layers 749 to cause fully connected layers 749 to generate an output. In some embodiments, fully connected layers 749 are configured to generate an output associated with a prediction (sometimes referred to as a classification).

As an example, the output can include a prediction regarding the location of an object within the interior of the vehicle 200. For example, the output can indicate a general area in which the object is located (e.g., on a particular seat of the vehicle, in a particular foot well of the vehicle, under a particular seat of the vehicle, in a particular storage compartment of the vehicle, in a particular seat pocket of the vehicle, etc.). As another example, the output can indicate a set of spatial coordinates representing the location of the object (e.g., a set of x-, y-, and z-coordinates having the vehicle as a frame of reference).

As an example, the output can include a prediction regarding the identity or type of an object within the interior of the vehicle 200. For example, the output can indicate a whether the object is a backpack, purse, handbag, wallet, suitcase, briefcase, luggage, article of clothing (e.g., coat, shirt, pants, hat, etc.), electronic device (e.g., computer, smart phone, tablet, headphones, earbuds, etc.), glasses, sports equipment (e.g., ball, bat, racket, golf club, helmet, etc.), tool (e.g., hammer, wrench, screwdriver, etc.), jewelry (e.g., ring, watch, earrings, necklace, etc.), and/or any other type of object.

In some embodiments, the object detection system 210 performs one or more operations and/or provides the data associated with the prediction to a different system, described herein.

Figure 8:
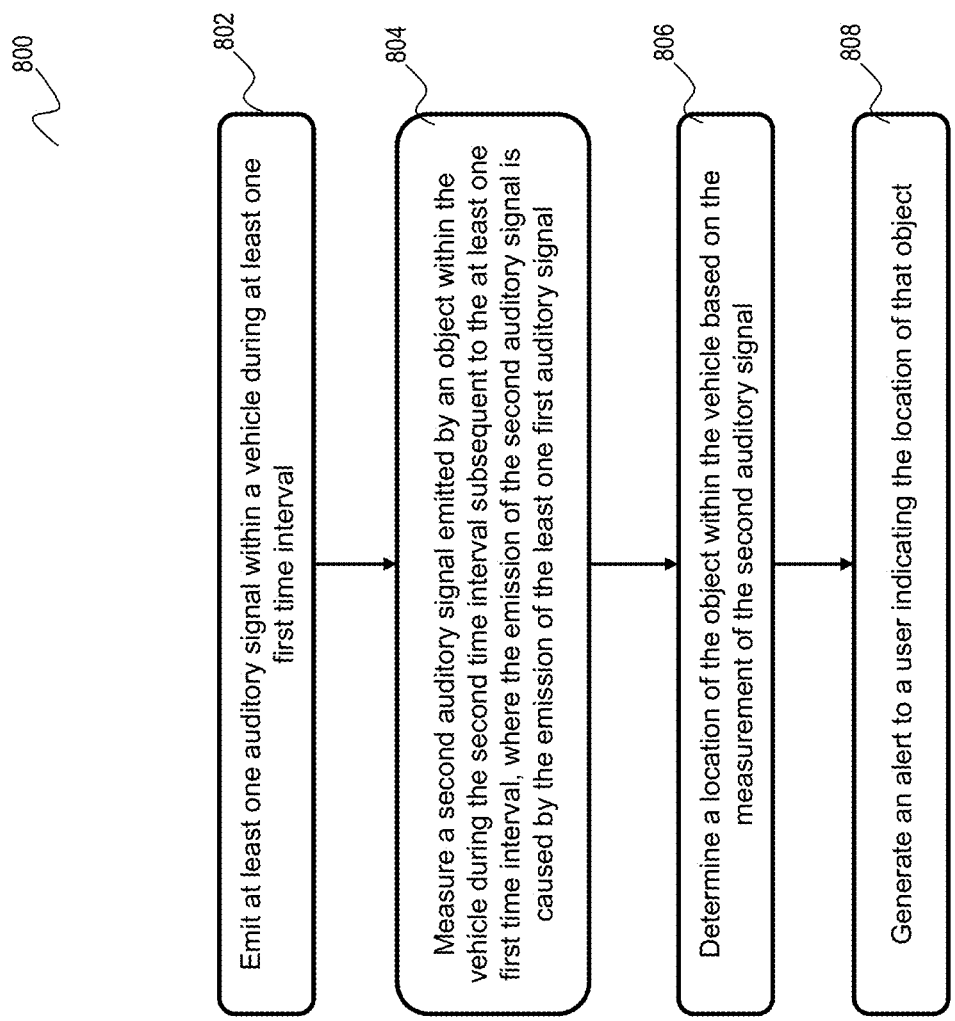
FIG. 8 is a flowchart of a process for detecting objects within a vehicle.

Referring now to FIG. 8, illustrated is a flowchart of a process 800 for detecting objects within a vehicle. In some embodiments, one or more of the steps described with respect to process 800 are performed (e.g., completely, partially, and/or the like) by the object detection system 210. Additionally, or alternatively, in some embodiments one or more steps described with respect to process 800 are performed (e.g., completely, partially, and/or the like) by another device or group of devices separate from or including the object detection system 210, such as a computer system remote from a vehicle (e.g., a server computer and/or a cloud computer system).

With continued reference to FIG. 8, an object detection system of a vehicle emits at least one auditory signal within the vehicle during at least one first time interval (block 802). In some implementations, the vehicle can be an autonomous vehicle.

In some implementations, the at least one auditory signal can include one or more ultrasonic signals, signal that are within an audible range of humans, and/or infrasonic signals. In some implementations, the at least on auditory signal can include at least one sinusoidal signal, sinusoid sweep signal, and/or impulse response signal.

In some implementations, the at least one auditory signal can be emitted during a single time interval. In some implementations, the at least one auditory signal can be emitted during a multiple first time intervals.

In some implementations, the system can determine that the user has exited the vehicle, and emit the at least one first auditory signal subsequent to determining that the user has exited the vehicle.

With continued reference to FIG. 8, the system measures a second auditory signal emitted by an object within the vehicle during the second time interval subsequent to the at least one first time interval (block 804). The emission of the second auditory signal is caused by the emission of the least one first auditory signal. For example, the second auditory signal can correspond a resonance of the object induced by the first auditory signal.

With continued reference to FIG. 8, the system determines a location of the object within the vehicle based on the measurement of the second auditory signal (block 806). In some implementations, the system can make this determination based on machine learning and/or signal triangulation.

With continued reference to FIG. 8, the system generates an alert to a user indicating the location of that object (block 808).

In some implementations, generating the alert can include emitting a third auditory signal at an exterior of the vehicle.

In some implementations, generating the alert can include transmitting an electronic message to a mobile device associated with the user.

In some implementations, the system also can determine a type of the object based on the measurement of the second auditory signal.

In some implementations, at least one of the location of the object or the type of the object can be determined based on a neural network having the measurement of the second signal as an input.

In some implementations, the system also can obtain image data (e.g., images and/or videos) regarding an interior of the vehicle from one or more image sensors (e.g., still cameras, video camera, etc.). The location of the object can be determined further based on the image data.

In some implementations, the at least one auditory signal can be emitted using a plurality of speaker within the vehicle concurrently. Further, the second auditory signal can be measured using a plurality of microphones within the vehicle concurrently. Further, the location of the object can be determined, at least on part, by triangulating a location of the object based on the measurements of the second auditory signal by the plurality of microphones.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
emitting, by an object detection system of a vehicle, at least one first auditory signal within the vehicle during at least one first time interval;
measuring, by the object detection system, a second auditory signal emitted by an object within the vehicle during a second time interval subsequent to the at least one first time interval, wherein the emission of the second auditory signal is caused by the emission of the at least one first auditory signal;
determining, by the object detection system, a location of the object within the vehicle based on the measurement of the second auditory signal; and
generating, by the object detection system, an alert to a user indicating the location of the object.

2. The method of claim 1, wherein generating the alert comprises:
emitting a third auditory signal at an exterior of the vehicle.

3. The method of claim 1, wherein generating the alert comprises:
transmitting an electronic message to a mobile device associated with the user.

4. The method of claim 1, further comprising:
determining that the user has exited the vehicle, and
wherein the at least one first auditory signal is emitted subsequent to determining that the user has exited the vehicle.

5. The method of claim 1, wherein a plurality of first auditory signals are emitted within the vehicle during a plurality of first time intervals.

6. The method of claim 1, wherein the at least one first auditory signal comprises a sinusoidal signal.

7. The method of claim 1, wherein the at least one first auditory signal comprises a sinusoidal sweep.

8. The method of claim 1, wherein the at least one first auditory signal comprises an impulse response signal.

9. The method of claim 1, further comprising:
determining a type of the object based on the measurement of the second auditory signal.

10. The method of claim 9, wherein at least one of the location of the object or the type of the object is determined based on a neural network having the measurement of the second signal as an input.

11. The method of claim 1, wherein the second auditory signal corresponds to a resonance of the object in response to the at least one first auditory signal.

12. The method of claim 1, further comprising:
obtaining, by the object detection system, image data regarding an interior of the vehicle from one or more image sensors, and
wherein the location of the object is determined further based on the image data.

13. The method of claim 1, wherein emitting the at least one first auditory signal comprises:
concurrently emitting the at least one first auditory signal using a plurality of speaker within the vehicle.

14. The method of claim 1, wherein measuring the second auditory signal comprises:
concurrently measuring the second auditory signal using a plurality of microphones within the vehicle.

15. The method of claim 14, wherein determining the location of the object comprises:
triangulating a location of the object based on the measurements of the second auditory signal by the plurality of microphones.

16. A system, comprising:
at least one processor; and
at least one non-transitory storage media storing instructions that, when executed by the at least one processor, cause the at least one processor to:
emit at least one first auditory signal within a vehicle during at least one first time interval;
measure a second auditory signal emitted by an object within the vehicle during a second time interval subsequent to the at least one first time interval, wherein the emission of the second auditory signal is caused by the emission of the at least one first auditory signal;
determine a location of the object within the vehicle based on the measurement of the second auditory signal; and
generate an alert to a user indicating the location of the object.

17. At least one non-transitory storage media storing instructions that, when executed by at least one processor, cause the at least one processor to:
emit at least one first auditory signal within a vehicle during at least one first time interval;
measure a second auditory signal emitted by an object within the vehicle during a second time interval subsequent to the at least one first time interval, wherein the emission of the second auditory signal is caused by the emission of the at least one first auditory signal;
determine a location of the object within the vehicle based on the measurement of the second auditory signal; and
generate an alert to a user indicating the location of the object.

18. The method of claim 1, wherein the object is within an interior cabin of the vehicle.

\* \* \* \* \*